US009873354B2

(12) United States Patent
Poulos et al.

(10) Patent No.: US 9,873,354 B2
(45) Date of Patent: Jan. 23, 2018

(54) LATERAL SLIDE PICKUP TRUCK REAR SEAT

(71) Applicant: Johnson Controls Technology Company, Holland, MI (US)

(72) Inventors: Yannis Poulos, Sylvania, OH (US); Dawn Macleod, South Lyon, MI (US); Eric Michalak, Northville, MI (US); Reinier Soliven, Oakland Township, MI (US); Sylviane Mayer, Saline, MI (US); Bradford V. Feiler, South Lyon, MI (US); Steven E. White, Farmingon Hills, MI (US); Prasanna Korlahalli, Westland, MI (US); John M. Beranek, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 79 days.

(21) Appl. No.: 14/974,297

(22) Filed: Dec. 18, 2015

(65) Prior Publication Data

US 2016/0176318 A1 Jun. 23, 2016

Related U.S. Application Data

(60) Provisional application No. 62/094,541, filed on Dec. 19, 2014.

(51) Int. Cl.
*B60N 2/30* (2006.01)
*B60N 2/06* (2006.01)
*B60N 2/12* (2006.01)
*B60N 2/10* (2006.01)

(52) U.S. Cl.
CPC .............. *B60N 2/12* (2013.01); *B60N 2/062* (2013.01); *B60N 2/065* (2013.01); *B60N 2/10* (2013.01); *B60N 2/305* (2013.01); *B60N 2/3011* (2013.01)

(58) Field of Classification Search
USPC ....................................... 244/118.6
See application file for complete search history.

(56) References Cited

U.S. PATENT DOCUMENTS

| 6,648,393 B1 * | 11/2003 | Milnar ............... B60N 2/01583 296/65.03 |
| 7,850,220 B2 * | 12/2010 | Holdampf ............ B60N 2/3011 296/65.09 |
| 2004/0100114 A1 * | 5/2004 | Rhodes ................. B60N 2/062 296/65.09 |

(Continued)

*Primary Examiner* — James M Ference
*Assistant Examiner* — Kyle J. Walraed-Sullivan
(74) *Attorney, Agent, or Firm* — McGlew and Tuttle, P.C.

(57) ABSTRACT

A stowable vehicle seat and seat arrangement are provided for a vehicle having a vehicle floor. The arrangement includes a first outboard seat with a seat base, a vehicle floor connection and a backrest connected to the seat base. A second outboard seat includes a seat base, a vehicle floor connection and a backrest and a lateral guide rail for lateral movement. The stowable seat includes a seat base, a backrest, a floor connection and a linkage between the seat base, the floor connection and the backrest for movement from a seating position blocking lateral movement of the second outboard seat to a stowage position in which the second outboard seat is moveable laterally along the lateral guideway to a position directly adjacent to the first outboard seat.

18 Claims, 11 Drawing Sheets

(56) References Cited

U.S. PATENT DOCUMENTS

| | | | | |
|---|---|---|---|---|
| 2006/0119155 A1* | 6/2006 | Huxter | .................... | B60N 2/06 297/331 |
| 2006/0220411 A1* | 10/2006 | Pathak | ............... | B60N 2/01541 296/65.11 |
| 2007/0132266 A1* | 6/2007 | Ghergheli | ............ | B60N 2/0292 296/65.09 |
| 2007/0158979 A1* | 7/2007 | Saberan | ............. | B60N 2/01558 297/47 |
| 2007/0278833 A1* | 12/2007 | Park | ......................... | B60N 2/30 297/15 |
| 2008/0100112 A1* | 5/2008 | Hausler | ................ | B60N 2/2209 297/331 |
| 2008/0122279 A1* | 5/2008 | Park | ......................... | B60N 2/01 297/332 |
| 2008/0238125 A1* | 10/2008 | Mahaffy | ............ | B60N 2/01508 296/65.09 |
| 2008/0284214 A1* | 11/2008 | Neale | ...................... | B60N 2/06 297/15 |
| 2009/0167068 A1* | 7/2009 | Yamagishi | ............... | B60N 2/12 297/340 |
| 2009/0322115 A1* | 12/2009 | Yamada | ................... | B60N 2/06 296/65.08 |
| 2011/0187146 A1* | 8/2011 | Lindsay | ................ | B60N 2/062 296/65.11 |
| 2012/0292962 A1* | 11/2012 | Takakura | ............... | B60N 2/062 297/232 |
| 2014/0015273 A1* | 1/2014 | Sawada | ............... | B60N 2/3011 296/65.09 |
| 2015/0175040 A1* | 6/2015 | Meszaros | ............... | B60N 2/305 297/188.01 |
| 2016/0052425 A1* | 2/2016 | Akutsu | ............... | B60N 2/3013 297/341 |

\* cited by examiner

LATERAL SLIDE PICKUP TRUCK REAR SEAT

CROSS REFERENCE TO RELATED APPLICATIONS

This application claims the benefit of priority under 35 U.S.C. §119, of U.S. Provisional Application 62/094,541 filed Dec. 19, 2014, the entire contents of which are incorporated herein by reference.

FIELD OF THE INVENTION

The present invention relates to a vehicle seat and more particularly to a rear vehicle seat or middle vehicle seat and a vehicle seat arrangement, particularly for a pickup truck

BACKGROUND OF THE INVENTION

Pickup trucks and vehicles with a cabin (cab) having a rear wall may have a rear seat behind the row with the driver seat. The rear seat is close to or at the rear cab wall. This presents a trade-off with regard to storage space behind the front row of seats and the provision of seats for rear seat passengers. Although pickup trucks with additional seating in the cabin, behind the front row of seats, may have an extended cab, the rear most seats occupy space that could otherwise be used for storing items.

Some pickup trucks have rear seat arrangements with a rear seat row having only limited room. To allow for a changeover between a seating arrangement and an arrangement which provides more stowage space, the rear seats may be so-called stadium seats that allow the seat base to be folded up. However, even in a folded up state, the stadium seat still occupies space behind the driver seat.

SUMMARY OF THE INVENTION

It is an object of the invention to provide a rear vehicle seat, for a pickup truck or vehicle with similar features, in which a seat is a stowable seat, such as a center seat, and can be moved into a stowed position allowing an outboard seat to be laterally moved toward the center to provide additional storage space at an outboard side (such as behind the driver seat), while still providing full seating functionality and stadium functionality for the laterally moved seat.

According to the invention, a vehicle seat is provided comprising a seat base, a seat backrest, a seat vehicle floor connection and a seat base and a seat backrest linkage arrangement providing a connection between the seat base, the seat vehicle floor connection and the seat backrest. The linkage arrangement provides movement of the seat base and the seat backrest from a seating or use position, with the seat base extending forward of the seat vehicle floor connection, and a stowage position with the seat base fully rearward of the seat vehicle floor connection.

The stowable vehicle seat may advantageously be a center seat with outboard seats on each lateral side. In the seating position, the center seat blocks a lateral movement of one of the outboard seats along a lateral guide rail (lateral guideway). In the stowage position the center seat provides clearance so as to not block a lateral movement of one of the outboard seats along the lateral guide rail, whereby with the center seat in the center seat stowage position, the at least one outboard seat is moveable laterally along the lateral guideway to a position directly adjacent to the other outboard seat.

The stowable seat provides the lateral clearance, for the lateral movement of an adjacent seat, based on linkage arrangements. The stowable seat is able to move from the use position, that blocks lateral movement of an adjacent seat, to the stowage position that provides clearance for the lateral movement. The stowable seat vehicle floor connection comprises left and right side floor brackets (risers) fixed to a vehicle cabin floor. Each floor bracket has a first floor bracket pivot and a second floor bracket pivot. The stowable seat backrest includes right and left side link parts, each link part comprising a first link part pivot and a second link part pivot. The stowable seat base and backrest linkage arrangement includes a right side linkage arrangement and a left side linkage arrangement. Each linkage arrangement comprises a first center link connected to the first link part pivot and connected to the first floor bracket pivot and a second center link connected to the second link part pivot and to the second floor bracket pivot. The first center link and the second center link, with connections to the link part and the floor bracket form a four bar linkage. With this four bar linkage, a pivoting of the first center link and the second center link relative to the fixed floor bracket moves the backrest and changes a backrest angle from a use position to an upright stowed position.

The left and right side floor brackets (risers) advantageously each have a seat base pivot. The stowable seat base includes left side and right side pivot brackets, each pivotably connected to the respective seat base pivot and each including a follower pin. The first center link comprises a cam slot. The follower pin extends into the cam slot and moves in the cam slot relative to the first center link during pivoting of the first center link, whereby the pivoting of the first center link relative to the fixed floor bracket moves the stowable seat base from a use position to an upright stowed position.

According to another aspect of the invention, a seat arrangement is provided for a vehicle having a vehicle floor, the seat arrangement comprises the stowable seat and a laterally moveable outboard seat with a seat base, a seat base to vehicle floor connection and a backrest connected to the seat base. The seat base to vehicle floor connection of the laterally moveable seat comprises a lateral guide rail arrangement, guiding a lateral movement of the laterally moveable seat, with respect to the vehicle floor, and supporting the laterally moveable seat with respect to the vehicle floor in at least two fixed positions.

Advantageously another outboard seat is provided and the stowable seat is a center seat. The other outboard seat has an outboard seat base, an outboard seat base to vehicle floor connection and ant outboard backrest connected to the seat base.

The outboard seats may advantageously each be stadium seats with the outboard seat base pivoting from a seating position into an upright position.

The seat between the two outboard seats is referred to as the center seat. However, the position need not be exactly or nearly center. The center seat may also be referred to as a middle seat, namely a seat between a left outboard seat and a right outboard seat. The seats may be of different lateral extent. For example, one outboard seat and the center seat may comprise about 60% of the lateral extent whereas the remaining outboard seat may comprise 40% of the lateral extent—a 40/20/40 arrangement. It is also possible to combine the right side and center seats into a 60% seat (or a 50% seat) that stows in the manner of the center seat described herein (this could be e.g., a 60/40 or a 50/50 arrangement). The stowable seat is, in this case, an outboard seat such as the right outboard seat. In this case the right (stowable) outboard seat is movable between a seating position and a stowed position and the left outboard seat moves laterally in front of the stowed right outboard seat. However, a split bench of 3 independent seats combines expanded storage with two seating positions. A 33/33/33 and a 40/20/40 arrangement would be typical. A 20/40/40 and a 40/40/20 arrangement are also possible. The 33/33/33 arrangement optimizes expanded storage with occupant comfort, while the other three arrangements present a trade off of one attribute vs another attribute.

Although the examples relate to the right lateral seat being fixed and the left lateral seat being laterally movable, the arrangement may be switched or both outboard seats may be laterally movable. However, most typically freeing up space behind the driver's seat is of interest.

The lateral guide rail arrangement may advantageously comprise lower rails fixed to a vehicle floor and upper adjuster rails fixed to the second outboard seat. The lower rails guide the movement of the upper adjuster rails to move the second outboard seat relative to the vehicle floor. The floor may include a lower floor level supporting the lower rail and an upper floor level supporting the other outboard seat and the stowable seat. The floor may also be a main cabin floor supporting the lower rail and also supporting the other outboard seat and the stowable seat. With the fixed rail fixed to the main (upper) floor of the cabin, such as adjacent to center seat floor connection, a plastic rail cover with slots (laterally extending openings) for each rail, may advantageously be provided over the fixed rails. The plastic cover may at least be partially covered by carpet having guide slots (similar to the guide slots described as to the upper floor).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, a seat arrangement generally designated 10 is provided for a vehicle 1 and in particular for a pickup truck having a cabin (cab) 4 with a cab rear wall 70. The seat arrangement 10 includes a right outboard seat 12, a center (stowable) seat 14 and a left (driver-side) outboard seat 16. Outboard seat 16 is a laterally moveable seat. Each of the seats 12, 14 and 16 are connected to a vehicle floor (either to the cab main floor 18 or to one of the upper floor 18 and the lower floor 52). The seats include cushions and trim but only the frame structure is shown in the Figures.

The right outboard seat 12 includes a seat base 20, a seat backrest (the back frame or backrest frame) 26 and vehicle connections (risers) 24, one at each of a left and right side. The vehicle connections 24 are fixed to the vehicle floor 18. The seat base 20 is connected to the backrest 26 and to the vehicle connections 24 by pivot fixtures (left and right side) 28. The right outboard seat 12 is fixed in position relative to the vehicle floor 18 via the connections 24. The base 20 is movable from a use position to a position with the seat base 20 folded up (stadium seat).

The left outboard seat 16 includes a seat base 30, a seat backrest (the back frame or backrest frame) 36 and vehicle connections (left and right side) generally designated 34. The connections 34 extend through guide slots 50 of the floor 18, or through slots of carpeting and a plastic rail guard. The connections 34 movably connect the left outboard seat 16 to the second vehicle floor 52 via upper rails 54 and lower rails 56 as described below. The seat base 30 is connected to the backrest 36 and to the vehicle connections 34 by pivot fixtures (left and right side) 38. The left outboard seat 16 is laterally movable and can be fixed relative to the floor 18 (floors 18, 52) in at least two positions. The left hand outboard seat (the laterally moveable seat) 16 is provided with an adjuster with a standard pawl & tooth (window) locking system, much like any front & rear seat comfort adjuster. This is actuated via a towel bar or a handle/push button actuator. The lower rails 56 are fixed to the vehicle body and are long, spanning the width of left outboard seat and center seat positions. The upper rails 54 are shorter and connect to the seat riser 58 as discussed below. The base 30 is movable from a use position to a position with the seat base 30 fold up (stadium seat).

The center seat 14 includes a seat base 40, a seat backrest 46, vehicle connections (left and right side floor brackets—risers) 44 and center seat base and backrest linkage arrangements (left and right side linkage mechanism) 80. The vehicle connections 44 are fixed to the floor 18. The center seat base and backrest linkage arrangements 80 and further aspects of the center seat 14 are discussed below with reference to FIGS. 13-18.

Figure 2:
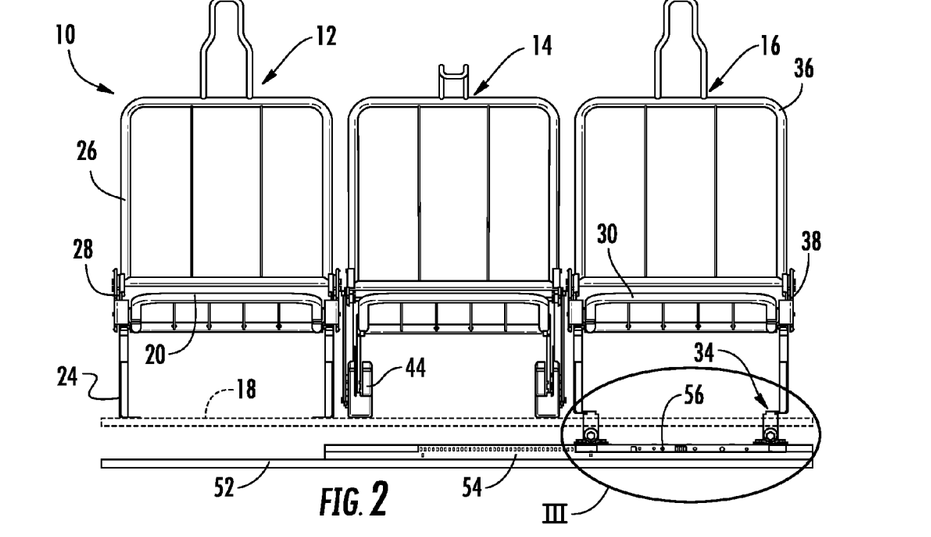
FIG. 2 is a front partially sectional view of the vehicle seat arrangement of FIG. 1.
Figures 3, 4:
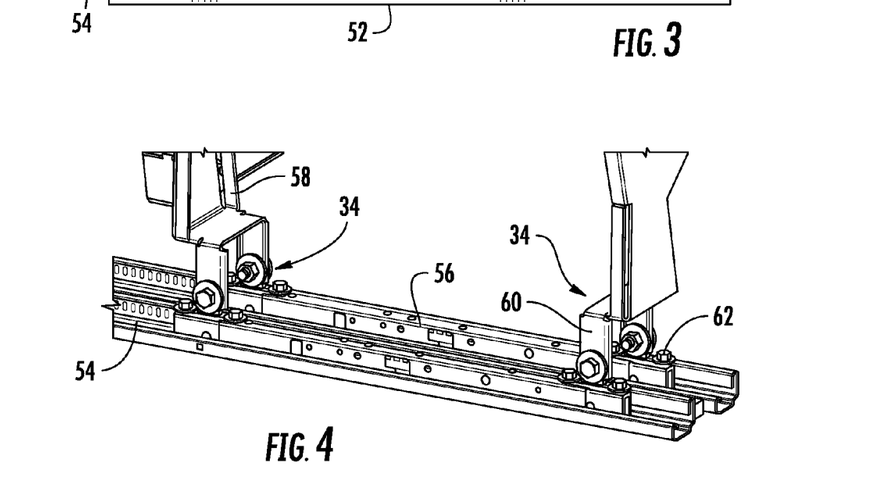
FIG. 3 is a partially sectional detail view showing a detail III of FIG. 2.
FIG. 4 is a partially cutaway perspective view of the detail III shown in FIG. 3.
Figure 5:
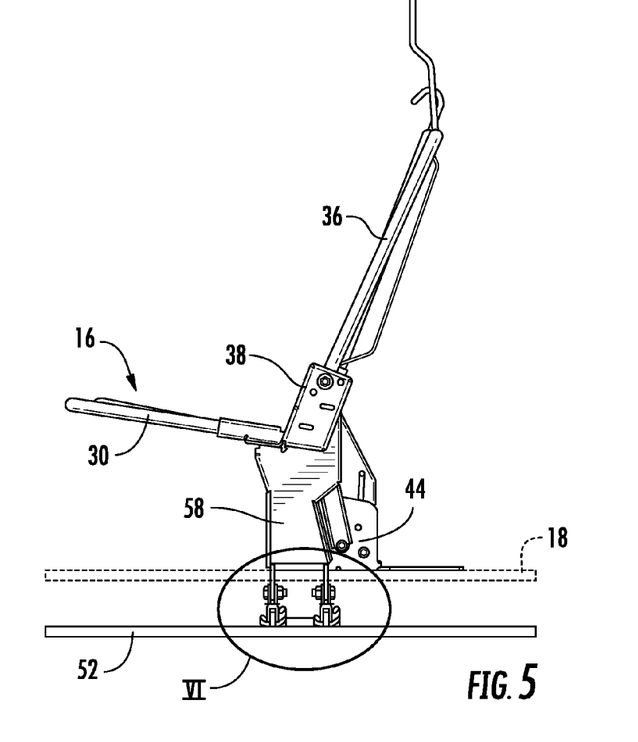
FIG. 5 is a partially sectional side view of the vehicle seat arrangement of FIG. 1.

FIG. 3 shows the detail III of FIG. 2 including a showing of the connections 34. The connections 34 each include a connection bracket (riser) 58 which extends upwardly and connects to the respective fitting 38 and the respective side of the backrest 36. Each bracket 58 includes two extension parts 60, extending downwardly through a respective slot 50 of the floor 18 (or through slots of the plastic rail cover). Connection brackets 64 are bolted to an upper surface of an adjuster upper rail 56. The two extension parts 60 are connected to the connection brackets 64 via a nut and bolt connection 62.

Figure 6:
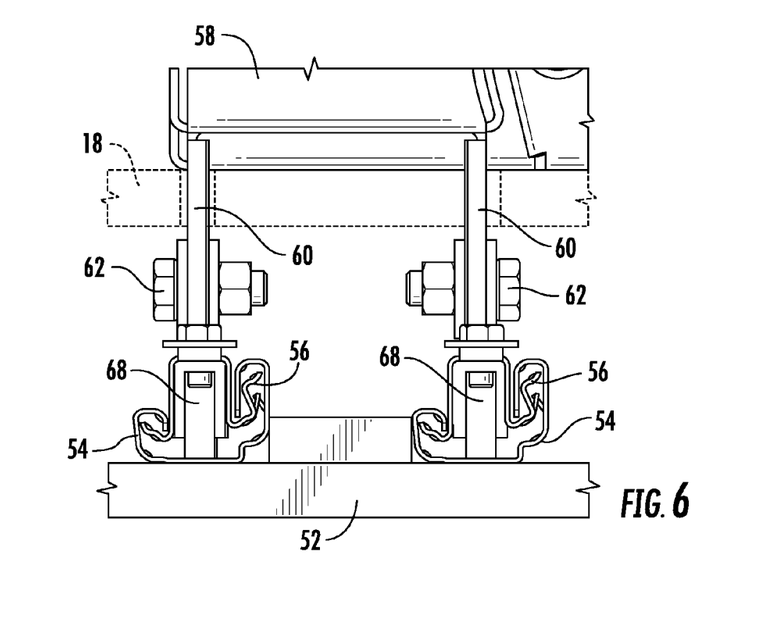
FIG. 6 is a partially sectional detail view showing a detail VI of FIG. 5.

A set of upper rails 56 and lower rails 54 have a sliding interface, including wheels 68 and an plastic slide block bearings. The adjuster upper rails 56 support wheels 68 rotatably so as to roll along a surface of lower rails 54. Each upper rail 56 has two wheels 68, one on each end. The wheels 68 enable the upper adjuster rails 56 to each travel on the respective long lower rail 54. In addition, in hook areas (FIG. 6) between upper rails 56 and lower rails 54 there are plastic slide blocks that provide stability to the seats. The plastic slide blocks are fixed to the lower rails 54. The plastic slide bearing blocks may each be connected to one of the rails 54 and extend over a length of the rail 54 and between the rail 54 and the respective rail 56. Each upper adjuster rail 56 has a shape cooperating with a shape of lower rail 52 (the hook areas—FIG. 6) so as to maintain the relative position as the adjuster upper rails 56 as the rails 56 move relative to the lower rails 54.

Instead of the fixed rails 54 being connected to a lower floor 52 and the movable rails 56 moving on the fixed rail 54, between the lower floor 52 and an upper floor 18, the fixed rail 54 may be fixed to the floor 18 (the cabin main floor). In this case no lower floor is required. In this case the lower rail 54, fixed to the cabin floor 18, may have a plastic rail cover (not shown). The plastic cover may be at least partially covered by carpet, with both having guide slots (similar to the guide slots 50). The guide slots and/or the plastic cover may have a fiber barrier to further protect the rail structure. The extension parts 60, in this case, pass through slots in the carpet and/or plastic cover.

Figure 1:
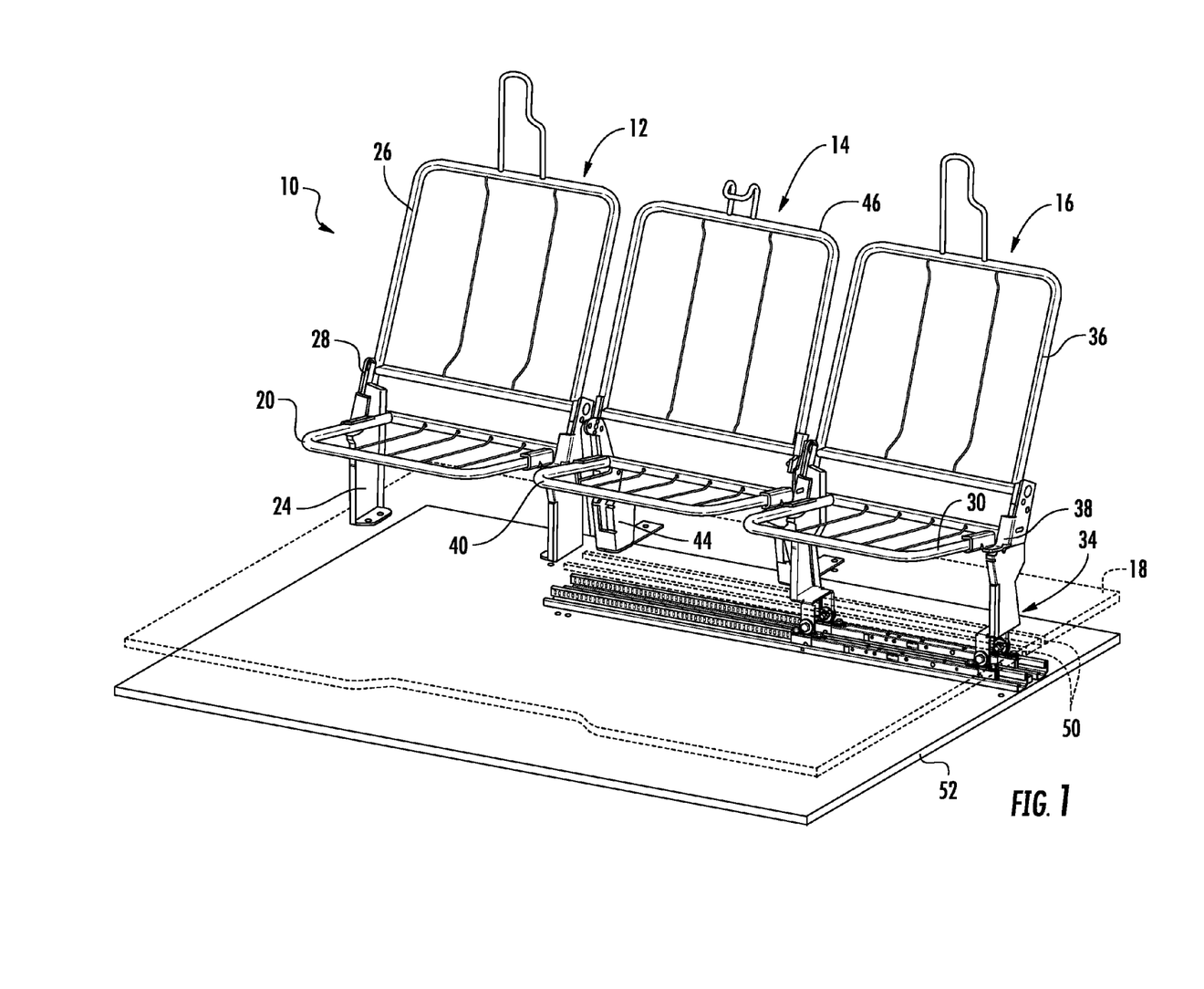
FIG. 1 is a perspective partially cutaway view showing a vehicle seat arrangement according to an embodiment of the invention.
Figure 7:
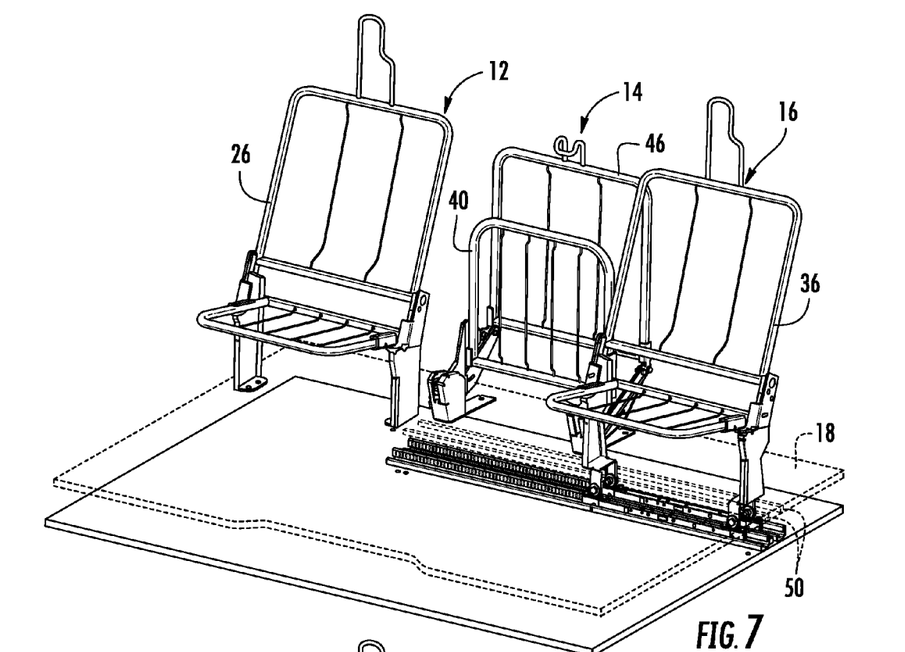
FIG. 7 is a perspective partially cutaway view showing a vehicle seat arrangement of FIG. 1, with the center seat in a stowed position and with the left outboard seat in an outboard position.
Figure 8:
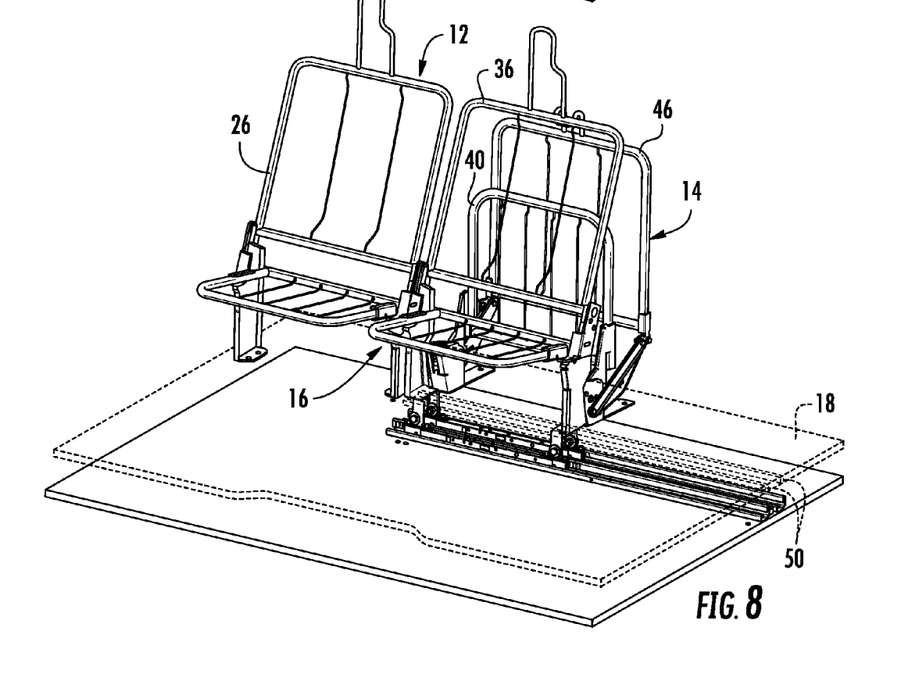
FIG. 8 is a perspective partially cutaway view showing a vehicle seat arrangement of FIG. 1, with the center seat in a stowed position and with the left outboard seat in an center position.

FIG. 7 shows the center seat 14 after the center seat 14 has been moved backwards from a use position, as shown in FIGS. 1 and 2, to a stowed position, toward the wall 70. In the stowed position, the center seat 14 is stowed, at a location that is mostly rearwards of the use position, to provide clearance for lateral movement of the left outboard seat 16. However, the vehicle connections 44 remain in position, as the vehicle connections 44 are fixed to the floor 18. The clearance allows the left outboard seat 16 to be move laterally in front of the center seat 14. The lateral movement is via a lateral guideway with upper guide rail 56 moving relative to lower guide rail 54. FIG. 8 shows the left outboard seat 16, after it has been laterally moved in front of the stowed center seat 14. The pawl and tooth system locks the lateral position of the left outboard seat 16 either in its outboard position (FIG. 7) or in its centered position (FIG. 8).

Each seat base (also known as cushion) 20, 30, 40 is fixed in the use and stow/stadium positions, via pin-plastic detent soft locks. A pin is attached to the seat base 20, 30, 40 and rotates with the seat base 20, 30, 40. The pin snaps into a "soft" lock of a fixed detent attached to the risers 24, 44, 58. The pin/detent feature can be combined with an inertia seat base (cushion) latch, which only locks the cushion in a sudden acceleration/stop event (crash). Another option is to provide a traditional cushion latch, which locks the cushion in use/stow positions and can be released via a release handle (handle with cable or similar).

Figure 9:
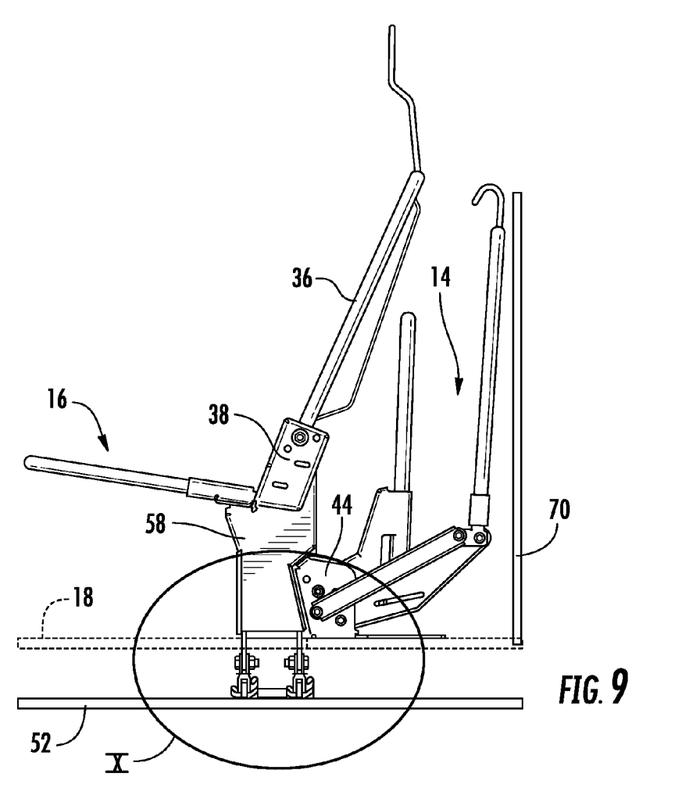
FIG. 9 is a partially sectional side view of the vehicle seat arrangement, with the center seat in the stowed position.
Figure 10:
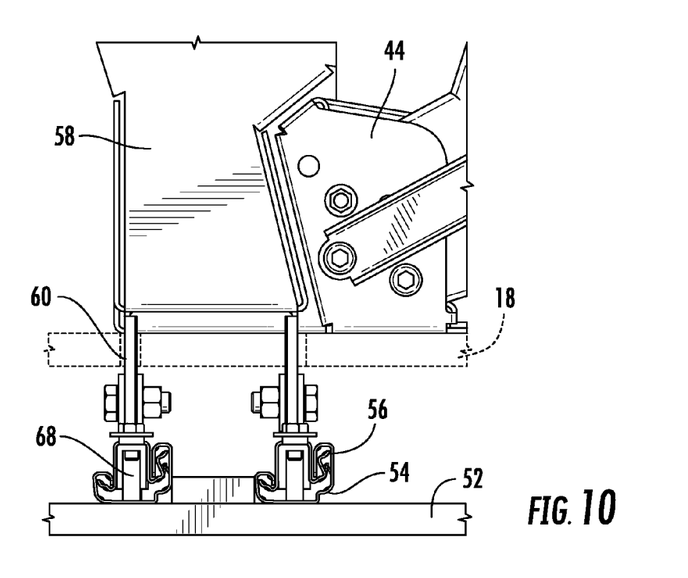
FIG. 10 is a partially sectional detail view showing a detail X of FIG. 9.
Figure 16:
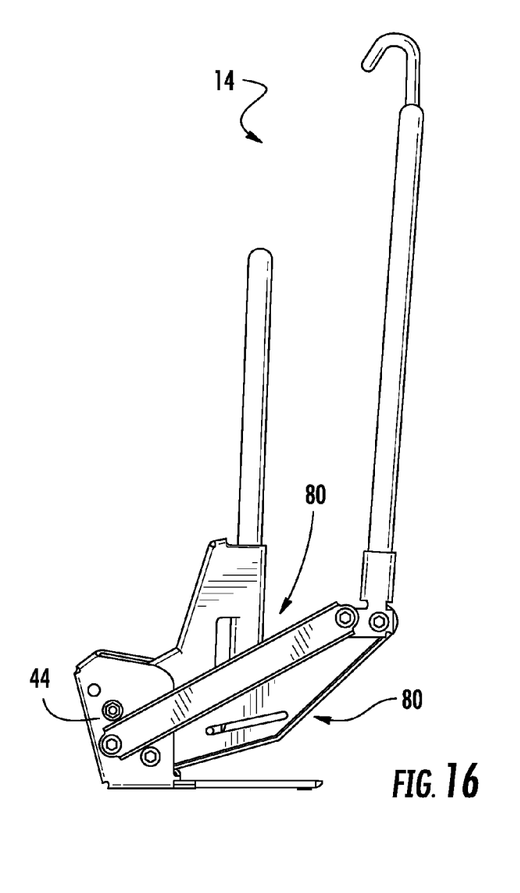
FIG. 16 is a side view of the center seat shown in FIG. 15.

The clearance, that allows the left outboard seats 16 to be moved laterally, is provided based on the shape, construction and position of the riser bracket 58 of the vehicle connection 34 of the left outboard seats 16 and based on the shape, construction and position of the vehicle connection 44 of the center seat 14. In particular the seat vehicle floor connection 44 comprises left and right side floor brackets fixed to a vehicle cabin floor 18. The left and right side floor brackets each have a frontmost contour defining an upright stowed position front clearance profile. In the stowage position, each of the seat backrest 26, the seat base 20 and the seat backrest linkage arrangement 80 is disposed rearwardly, with respect to a vehicle direction of travel, of the front clearance profile (FIG. 16). The second outboard seat base to vehicle floor connection 34 comprises the left and the right side riser brackets 58, which connect the lateral guide rail arrangement to the second outboard seat base 30 and the second outboard backrest 36. The left and right side riser brackets 58 each have a rearmost contour defining a rear clearance profile. The front clearance profile is complementary to the rear clearance profile whereby the left and right side floor brackets 44 do not block the left and right side riser brackets 58 upon a lateral movement of the second outboard seat along the lateral guide rail with the stowable seat 14 in the stowage position. The clearance and the clearance profiles can be seen in FIGS. 9 and 10.

Figure 11:
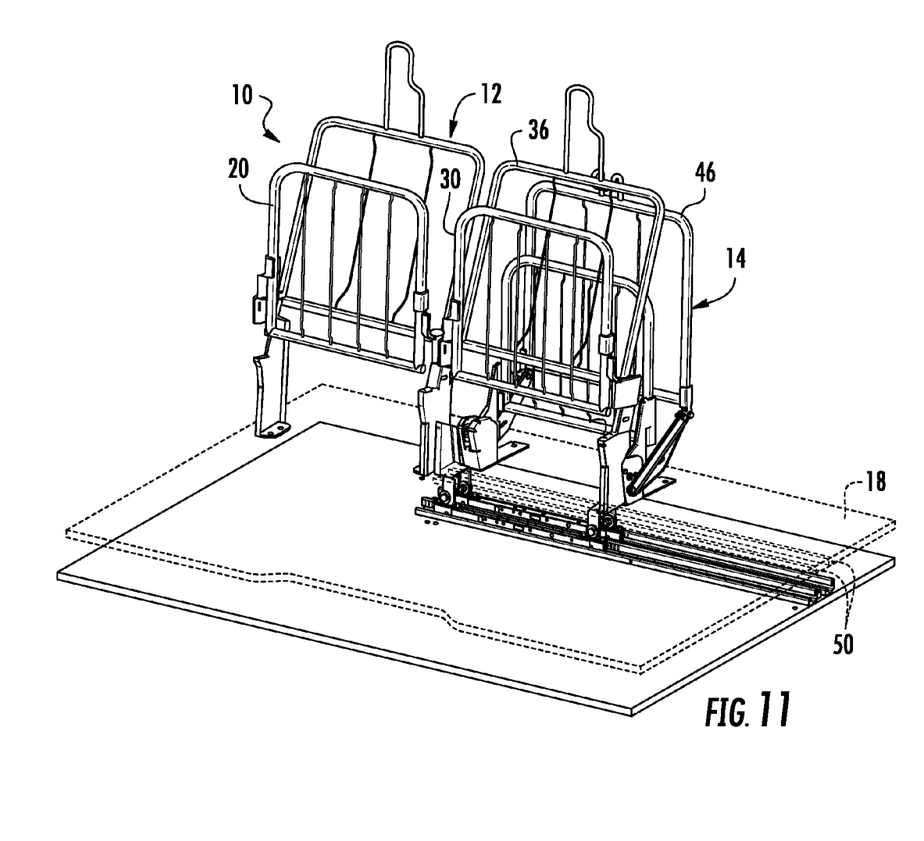
FIG. 11 is a perspective partially cutaway view showing the vehicle seat arrangement of FIG. 1, with the center seat in a stowed position and with the left outboard seat in a center position and in a folded up (stadium seat) state.
Figure 12:
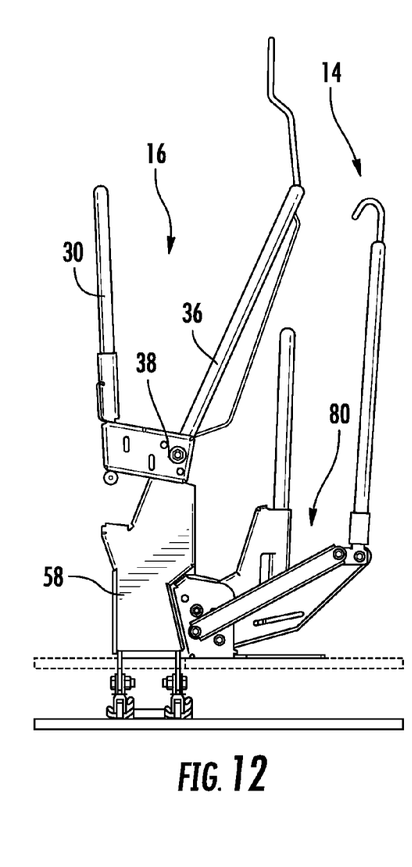
FIG. 12 is a partially sectional side view of the vehicle seat arrangement, with the seats in positions as shown in FIG. 11.
Figure 13:
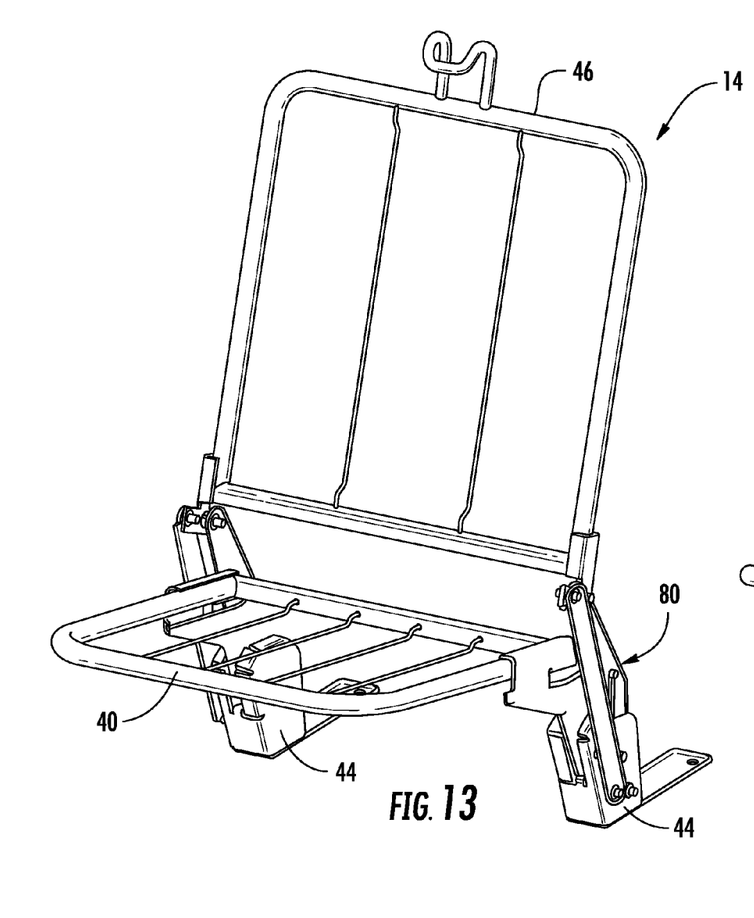
FIG. 13 is a perspective view of the center seat in a use position.
Figure 14:
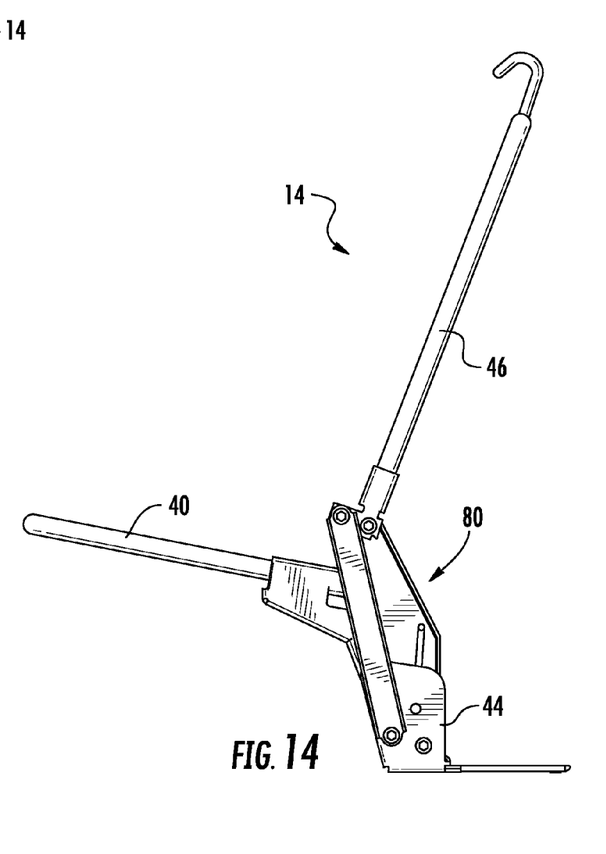
FIG. 14 is a side view of the center seat as shown in FIG. 13.

FIG. 11 is a view similar to FIG. 8, but shows each of the seat base 20 and seat base 30 in an upright position, the stadium seating position. FIG. 12 shows the side view of the stadium seating position, also showing the center seat 14 in the stowed position. The seat base 30 is connected via pivot fixtures 38 to the backrest 36 and to the connections 34, such that the seat base 30 may be pivoted up. In a similar manner the seat base 20 is connected by pivot fixtures 28 to the backrest 26 and to the connections 24, such that seat base 20 may be pivoted up. With this pivoting up of the seats 12 and 16, the seat arrangement 10 takes up the least amount of space in the cab 4.

Figure 15:
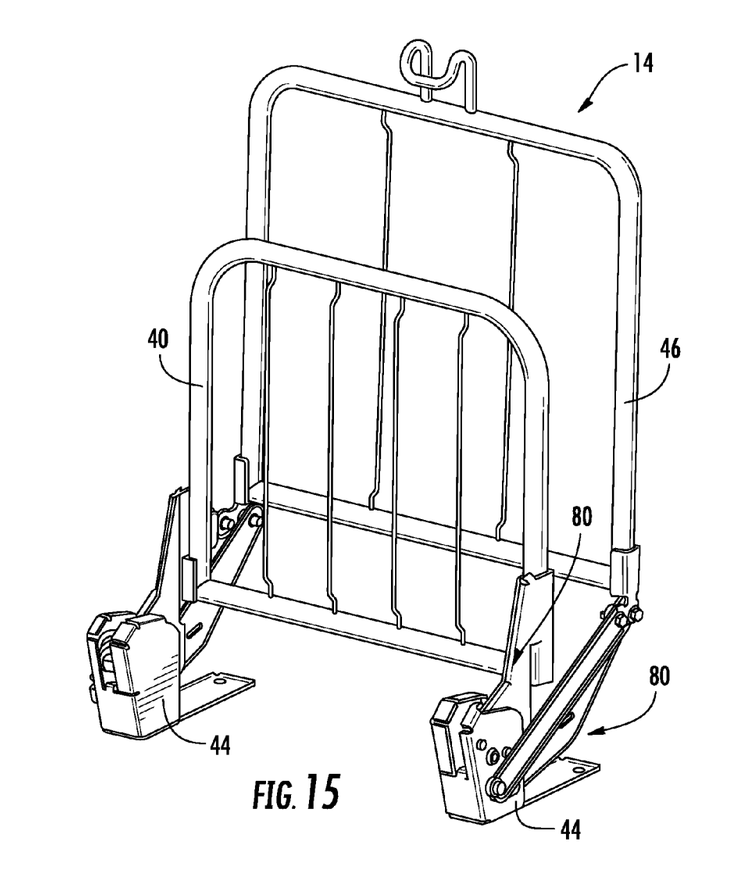
FIG. 15 is a perspective view of the center seat in a stowed position.

FIGS. 13-18 illustrate the kinematics of the center seat 14. The center seat 14 is moved from the use position shown in FIGS. 13 and 14 to the stowed position as shown in FIGS. 15 and 16 based on the kinematics provided by the center seat base and backrest linkage arrangements 80. One center seat base and backrest linkage arrangement 80 is provided at each side of the center seat 12.

Figure 17A:
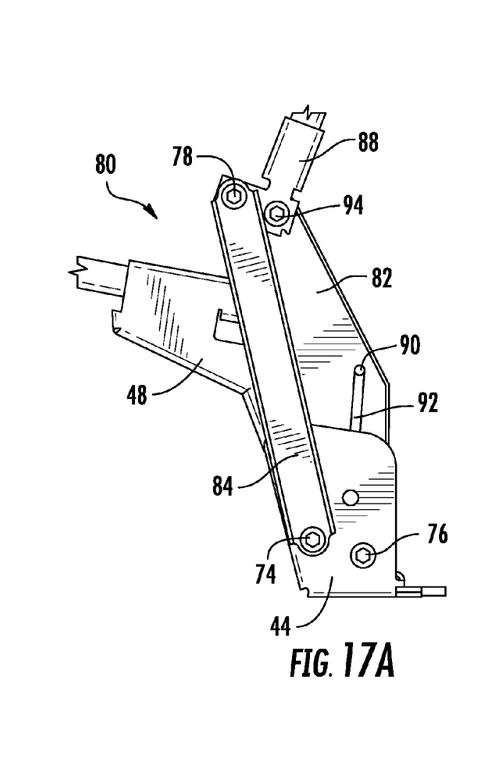
FIG. 17A is a cutaway side view showing the center seat linkage mechanism in a use position.
Figure 17B:
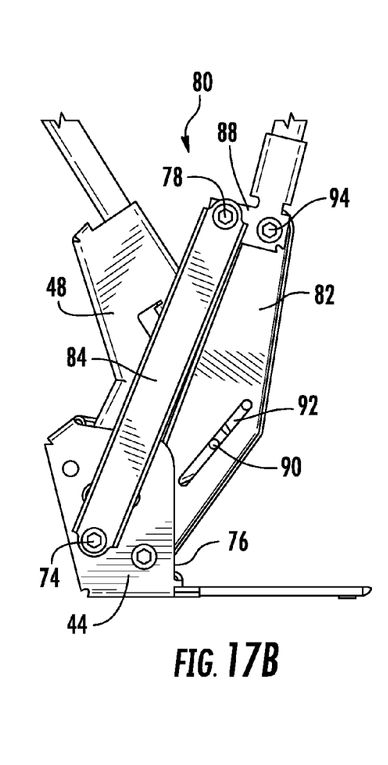
FIG. 17B is a cutaway side view showing the center seat linkage mechanism in a mid position.
Figure 17C:
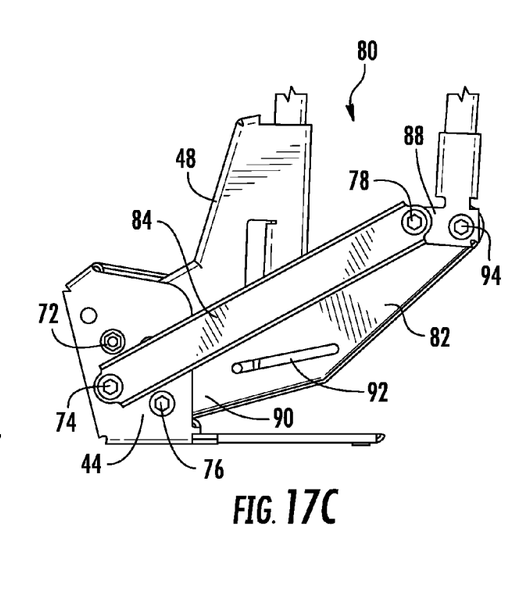
FIG. 17C is a cutaway side view showing the center seat linkage mechanism in a stowed position.

Each linkage arrangement 80 cooperates with the respective vehicle connection 44 and with a respective pivot bracket 48 of the seat base 40. Each vehicle connection 44 includes pivot connections 72, 74 and 76. Each bracket 48 is connected to the respective vehicle connection 44 via the seat base pivot connection 72 (FIGS. 17A-17C). The linkage arrangement 80 includes a first center link 82 and a second center link 84. The first center link 82 is connected to the vehicle connection via the pivot connection (first floor bracket pivot) 76. The second center link 84 is connected to the vehicle connection 44 by the pivot connection (second floor bracket pivot) 74. The first center link 82 includes a slot (cam slot) 92, which receives a pin (follower pin) 90. The pin 90 is fixed to the pivot bracket 48 of the seat base 40. The linkage arrangement 80 also includes a backrest link part 88. The link part 88 has a pivot connection 94 to the first center link 82 and a pivot connection 78 to the second center link 84. The link part 88 is fixed to the backrest 46. As such, a position (orientation) of backrest 46 is fixed with respect to a position (orientation) of the link part 88. The link arrangement 80, with vehicle connection 44 having pivot connections 74 and 76, with link part 88 having first link part pivot 94 and second link part pivot 78, and with center links 82 and 84, forms a four bar linkage. A rotational movement of the four bar linkage from the position shown in FIG. 17A to the position shown in FIG. 17C, results in the movement of the backrest 46 from a reclining position, shown in FIGS. 13 and 14, to an upright position as shown in FIGS. 15 and 16. With this movement of the four bar linkage, and particularly the pivoting movements of the first center link 82 about the pivot 76, the pin 90 is forced to move along the slot 92. This results in a movement of the seat base 40 from the position shown in FIGS. 13 and 14 to the upright position shown in FIGS. 15 and 16.

Figure 18:
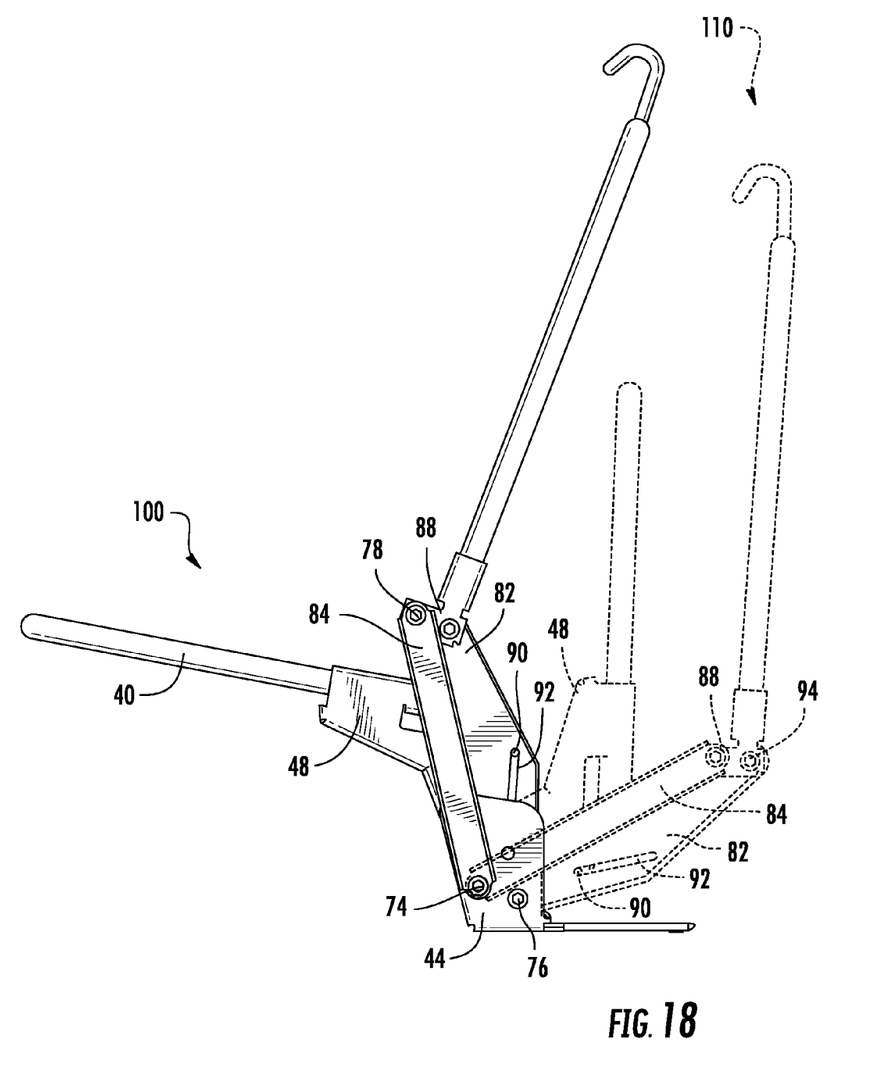
FIG. 18 is a side view showing the center seat linkage mechanism with the center seat shown simultaneously in both a use position and a stowed position.

FIG. 18 shows both the use position 100 and stowed position 110 of the center seat 14. This illustrates that the vehicle connection 44 is fixed but other features of the seat 14 are moved from the use and seating position to the stowed position, to provide the clearance and allow lateral movement of the seat 16, as described above.

Figure 19:
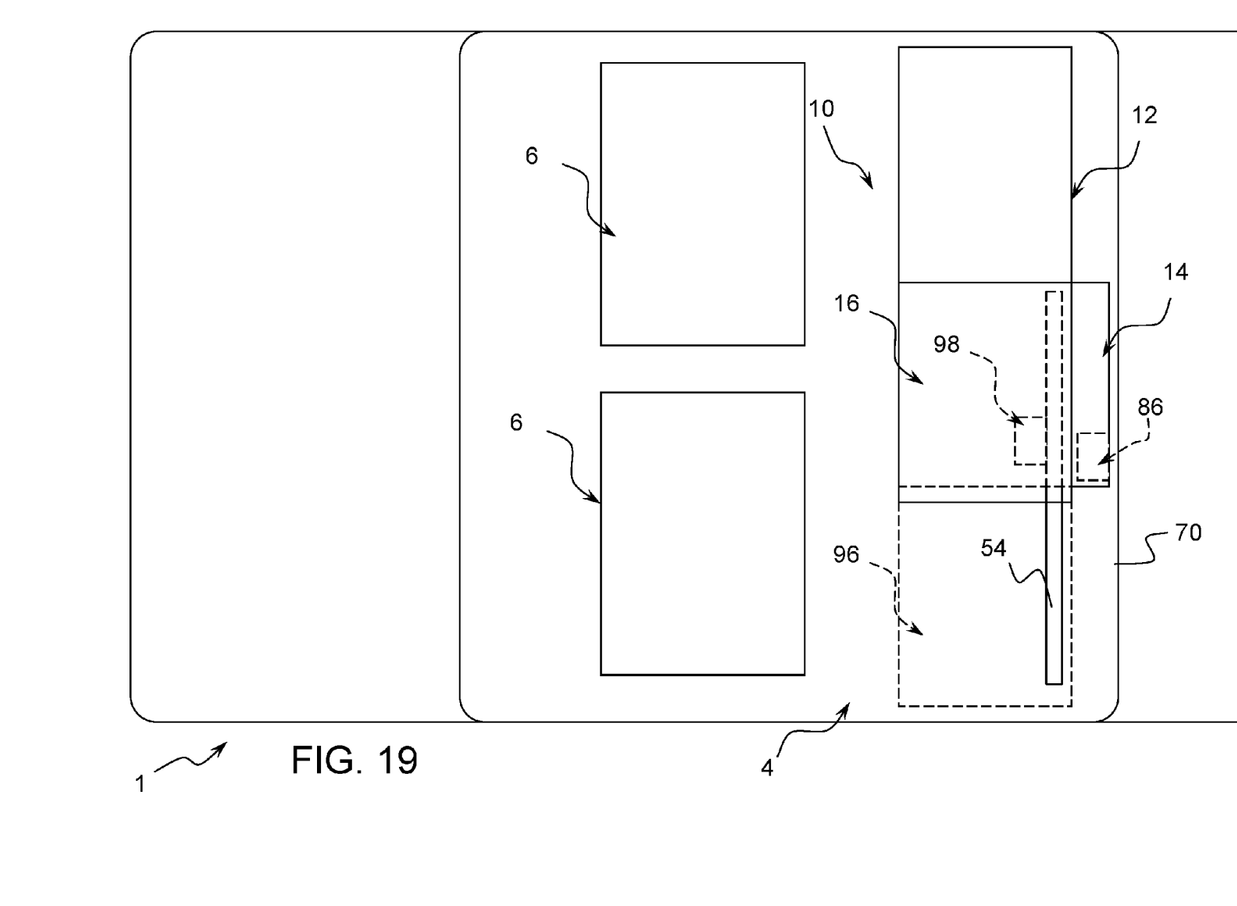
FIG. 19 is a schematic view showing a vehicle with a seat arrangement (layout) according to the invention.

FIG. 19 schematically shows a truck or similar vehicle 1 with a cab 4 having front seats 6. The cab 4 also has the vehicle seat arrangement 10 as described above. With the seat 14 in the storage position as shown, the left outboard seat 16 is laterally moved to the center position. This provides a region 96 where the seat 16 had been, which is no longer fully occupied by the seat 16. As noted, the seats may be of various sizes. In FIG. 19, the center seat 14 has a somewhat smaller lateral extent than the outboard seats 12 and 16. The lateral seat 16 does not fully move out of the region 96. As noted, the arrangement 10 may be provided with the seats 12, 14 and 16 having a lateral extent selected as desired. Other dimensional modifications, using the concepts according to the invention, may also be provided.

The right outboard seat 12 may also be formed corresponding to the description of the center seat 14. In this case the right outboard seat may be stowed in a position that is out of a lateral movement path of the other outboard seat, having features corresponding to the outboard seat 16. If the seats 12 and 16 are the only seats, they may each occupy approximately 50% of the lateral extent of the cab 4.

Each of the outboard seats 12 and 16 may have connections between the backrests 26 and 36 and the remainder of the seat to allow for reclining of the backrest 26, 36. The right outboard seat 12 reclining feature may be provided by a standard fixture connecting the backrest 26 and seat base 20. The left outboard seat (laterally moveable seat) 16 can have a similar fixture for reclining the backrest 36 relative to the seat base 30. However, before the left outboard seat (laterally moveable seat) 16 starts to move laterally, the backrest 36 must rotate to an initial position (the position shown in the drawings) to avoid engaging the center seat 14 during the lateral movement. As such, a logic feature is required to return the backrest 36 to the initial position before the lateral movement is started.

The left outboard seat 16 may be laterally moved between the outboard and the center position with a power drive generally designated 98. The center seat (stowable seat) 14 may also have a power stow feature with power drive 86 connected to the seat 14 to move between the use and the stowed position with the power drive 86 providing the powered adjustment.

Although the arrangement 10 of the invention is particularly useful for a pickup truck as the vehicle 1, the arrangement may also be used for an easy entry/access option, with the arrangement being a second row of an SUV (sport utility vehicle) or a van type of vehicle 1 that has a third row of seats (the wall 70 is much farther behind the seats 12, 14 and 16), which third row of seats is provided behind seats 12, 14 and 16. The easy entry function allows entry (past seats 12, 14 and 16) and access to the third row. The power options, with the power drives 98 and 86, are particularly useful for the easy entry/access option providing the easy entry function for the third row of the SUV or van type of vehicle.

While specific embodiments of the invention have been shown and described in detail to illustrate the application of the principles of the invention, it will be understood that the invention may be embodied otherwise without departing from such principles.

APPENDIX

List of Reference Symbols 1 vehicle
4 cabin (cab)
6 front seat
10 seat arrangement
12 right outboard seat
14 stowable seat/center seat
16 left outboard
18 upper floor
20 seat base
24 vehicle connection
26 seat backrest
28 pivot fixture
30 seat base
34 vehicle connection
36 seat backrest
38 pivot fixture
40 seat base
44 vehicle connection
46 seat backrest
48 pivot bracket
50 through slots
52 lower floor
54 lower rail
56 upper adjuster rail
58 riser brackets
60 extension parts
62 bolt connection
64 connection bracket
70 cab rear wall
72 pivot connection
74 pivot connection
76 pivot connection
80 backrest linkage arrangement
82 first center link
84 second center link
86 power drive 88 link part
90 pin
92 slot
94 pivot connection
96 free region
98 power drive
100 center seat use position
110 center seat stowed position

What is claimed is:

1. A vehicle seat for a vehicle having a forward direction corresponding to a travel direction and an opposite rearward direction, the vehicle seat comprising:
a seat base;
a seat backrest;
a seat vehicle floor connection fixed to a vehicle floor, the seat vehicle floor connection having a forward most front clearance profile; and
a seat base and seat backrest linkage arrangement providing a connection between the seat base, the seat vehicle floor connection and the seat backrest for coordinating movement of the seat base and the seat backrest from a vehicle seat seating position, with the seat base extending forward from the seat backrest and extending forward of the forward most front clearance profile of the seat vehicle floor connection, to a stowed position with the seat base and the seat backrest fully rearward of the forward most front clearance profile of the seat vehicle floor connection in the stowed position, wherein:
the vehicle seat is a center seat with outboard seats on each lateral side;
in the seating position the center seat blocks a lateral movement of one of the outboard seats along a lateral guide rail, to a center seat stowed position, with the center seat connected to the vehicle floor; and
in the stowed position the center seat provides clearance so as to not block a lateral movement of the one of the outboard seats along the lateral guide rail, whereby with the center seat in the center seat stowed position, the one of the outboard seats is moveable laterally along the lateral guide rail to a position directly adjacent to another of the outboard seats.

2. A vehicle seat according to claim 1, wherein:
the seat backrest includes a right side link part and a left side link part, the right side link part and the left side link part each comprising a first link part pivot and a second link part pivot;
the seat vehicle floor connection comprises a left side floor bracket and a right side floor bracket, each fixed to a vehicle cabin floor, the left side floor bracket and the right side floor bracket each having a first floor bracket pivot and a second floor bracket pivot; and
the seat base and backrest linkage arrangement comprises a right side linkage arrangement and a left side linkage arrangement and each linkage arrangement comprises a first center link connected to the first link part pivot and connected to the first floor bracket pivot and a second center link connected to the second link part pivot and the second floor bracket pivot, whereby the first center link and the second center link, the respective right side link part or the left side link part and the respective right side floor bracket or left side floor bracket, form a four bar linkage whereby pivoting of the first center link and the second center link relative to the respective right side floor bracket or left side floor bracket moves the seat backrest and changes a backrest angle from the vehicle seat seating position to a more upright stowed position, wherein the backrest angle in the stowed position is closer to vertical than the backrest angle in the vehicle seat seating position.

3. A vehicle seat according to claim 2, wherein:
the left and right side floor brackets each have a seat base pivot;
the seat base includes left side and right side pivot brackets each pivotably connected to the respective seat base pivot and each including a follower pin;
the first center link comprises a cam slot and the follower pin extends into the cam slot and moves in the cam slot relative to the first center link during pivoting of the first center link, whereby the pivoting of the first center link relative to the floor bracket moves the seat base from the vehicle seat seating position to an upright stowed position.

4. A vehicle seat according to claim 1, wherein:
the seat vehicle floor connection comprises left and right side floor brackets fixed to a vehicle cabin floor;
the left and right side floor brackets each have a frontmost contour defining an upright stowed position front clearance profile; and
in the stowed position, each of the seat backrest, the seat base and the seat backrest linkage arrangement is disposed rearwardly, with respect to a vehicle direction of travel, of the front clearance profile.

5. A seat arrangement for a vehicle having a forward direction corresponding to a travel direction and an opposite rearward direction, the seat arrangement comprising:
a first outboard seat comprising a first outboard seat base, a first outboard seat base to vehicle floor connection and a first outboard backrest connected to the first outboard seat base;
a second outboard seat comprising a second outboard seat base, a second outboard seat base to vehicle floor connection and a second outboard backrest connected to the second outboard seat base, the second outboard seat base to vehicle floor connection comprising a lateral guide rail arrangement, guiding a lateral movement of the second outboard seat with respect to a vehicle floor and supporting the second outboard seat with respect to the vehicle floor in at least two fixed positions;
a stowable seat comprising a stowable seat base, a stowable seat backrest, a stowable seat vehicle floor connection having a forward most front clearance profile, a stowable seat base and stowable seat backrest linkage arrangement providing a connection between the stowable seat base, the stowable seat vehicle floor connection and the stowable seat backrest for coordinating movement of the stowable seat base and the stowable seat backrest from a seating position, with the stowable seat connected to the vehicle floor, with the stowable seat base extending forward from the stowable seat backrest and extending forward of the forward most front clearance profile of the seat vehicle floor connection and with the stowable seat blocking a lateral movement of the second outboard seat along the lateral guide rail, to a stowed position, with the stowable seat connected to the vehicle floor, with the stowable seat base and the stowable seat backrest disposed rearward of the forward most front clearance profile of the seat vehicle floor connection and with the stowable seat not blocking a lateral movement of the second outboard seat along the lateral guide rail, whereby with the stowable seat in the stowable seat stowed position, the second outboard seat is moveable laterally along the lateral guide rail to a position directly adjacent to the first outboard seat.

6. A seat arrangement according to claim 5, wherein:
the stowable seat vehicle floor connection comprises left and right side floor brackets fixed to a vehicle cabin floor;
the left and right side floor brackets each have a frontmost, with respect to the direction of travel, contour defining an upright stowed position front clearance profile; and
in the stowed position, each of the stowable seat backrest, the stowable seat base and the stowable seat backrest linkage arrangement is disposed rearwardly, with respect to a vehicle direction of travel, of the upright stowed position front clearance profile;
the second outboard seat base to vehicle floor connection further comprises left and right side riser brackets connecting the lateral guide rail arrangement to the second outboard seat base and the second outboard backrest;
the left and right side riser brackets each have a rearmost contour defining a rear clearance profile; and
the front clearance profile is complementary to the rear clearance profile whereby the left and right side floor brackets do not block the left and right side riser brackets with the lateral movement of the second outboard seat along the lateral guide rail with the stowable seat in the stowed position.

7. A seat arrangement according to claim 5, wherein:
at least one of the first outboard seat base and the second outboard seat base pivots from a seating position into an upright stadium position.

8. A seat arrangement according to claim 5, wherein:
the lateral guide rail arrangement comprises a lower rail fixed to a vehicle floor and an upper adjuster rail fixed to the second outboard seat, the lower rail guiding the movement of the upper adjuster rail to move the second outboard seat relative to the vehicle floor.

9. A seat arrangement according to claim 8, wherein:
the vehicle floor includes a lower floor level supporting the lower rail and an upper floor level supporting the first outboard seat and the stowable seat.

10. A seat arrangement according to claim 5, wherein:
the stowable seat backrest includes a right link part and a left side link part, each of the right link part and the left link part comprising a first link part pivot and a second link part pivot;
the stowable seat vehicle floor connection comprises a left side floor bracket and a right side floor bracket, each fixed to a vehicle cabin floor, each of the left side floor bracket and the right side floor bracket comprising a first floor bracket pivot and a second floor bracket pivot; and
the stowable seat base and backrest linkage arrangement comprises a right side linkage arrangement and a left side linkage arrangement and each linkage arrangement comprises a first center link connected to the first link part pivot and connected to the first floor bracket pivot and a second center link connected to the second link part pivot and the second floor bracket pivot, whereby the first center link and the second center link, the respective right link part or left link part and the respective right floor bracket or left floor bracket form a four bar linkage whereby pivoting of the first center link and the second center link relative to the respective right floor bracket or left floor bracket moves the stowable seat backrest and changes a backrest angle from a use position to an upright stowed position.

11. A seat arrangement according to claim 10, wherein:
the left and right side floor brackets each have a seat base pivot;
the stowable seat base includes a left side pivot bracket and a right side pivot bracket, each pivotably connected to the respective seat base pivot and each including a follower pin; and
the first center link comprises a cam slot and the follower pin extends into the cam slot and moves in the cam slot relative to the first center link during pivoting of the first center link, whereby the pivoting of the first center link relative to the floor bracket moves the stowable seat base from a use position to an upright stowed position.

12. A vehicle seat according to claim 1, wherein:
the seat backrest includes a link part comprising a first link part pivot and a second link part pivot;
the seat vehicle floor connection comprises a floor bracket fixed to a vehicle floor, the floor bracket comprising a first floor bracket pivot and a second floor bracket pivot; and
the seat base and seat backrest linkage arrangement comprises a linkage arrangement comprising a first center link connected to the first link part pivot and connected to the first floor bracket pivot and a second center link connected to the second link part pivot and the second floor bracket pivot, whereby the first center link, the second center link, the link part and the floor bracket form a four bar linkage whereby pivoting of the first center link and the second center link relative to the floor bracket moves the seat backrest and changes a backrest angle from the vehicle seat seating position to the stowed position, which stowed position of the seat backrest is more upright than the vehicle seat seating position of the seat backrest.

13. A vehicle seat according to claim 1, wherein:
the vehicle seat is adjacent to a vehicle rear wall or rear bulkhead; and
in the stowed position the seat base and the seat backrest are fully rearward of the forward most front clearance profile of the seat vehicle floor connection and are forward of the vehicle rear wall or rear bulkhead.

14. A vehicle seat according to claim 1, wherein:
the seat vehicle floor connection comprises left and right side floor brackets fixed to a vehicle cabin floor;
the left and right side floor brackets each have a frontmost contour defining an upright stowed position front clearance profile; and
one of the outboard seats has a base to vehicle floor connection further comprising left and right side riser brackets connecting to a lateral guide rail arrangement and the left and right side riser brackets have a rearmost contour defining a rear clearance profile; and
the front clearance profile is complementary to the rear clearance profile whereby the left and right side floor brackets do not block the left and right side riser brackets with a lateral movement of the one of the outboard seats along the lateral guide rail, with the vehicle seat in the stowed position.

15. A seat arrangement according to claim 5, wherein:
the stowable seat backrest includes a link part comprising a first link part pivot and a second link part pivot;

the stowable seat vehicle floor connection comprises a floor bracket fixed to the vehicle floor, the floor bracket comprising a first floor bracket pivot and a second floor bracket pivot; and the stowable seat base and seat backrest linkage arrangement comprises a first center link connected to the first link part pivot and connected to the first floor bracket pivot and a second center link connected to the second link part pivot and the second floor bracket pivot, whereby the first center link, the second center link, the link part and the floor bracket form a four bar linkage whereby pivoting of the first center link and the second center link relative to the floor bracket moves the seat backrest and changes a backrest angle from the vehicle seat seating position to the stowed position, which stowed position of the seat backrest is closer to a vertical position than the vehicle seat seating position of the seat backrest.

16. A seat arrangement according to claim 5, wherein:

a stowable seat base includes a right side pivot bracket and a left side pivot bracket;

the stowable seat vehicle floor connection fixed to a vehicle floor and comprises a right side floor bracket with a right side seat base pivot and a left side floor bracket with a left side seat base pivot, the right side pivot bracket being pivotably connected to the right side seat base pivot and the left side pivot bracket being pivotably connected to the left side seat base pivot; and the stowable seat base and seat backrest linkage arrangement defines a cam slot and at least one of the right side pivot bracket and the left side pivot bracket further comprises a cam follower extending into the cam slot and moving in the cam slot relative to the seat base and seat backrest linkage arrangement during the movement of the seat base and the seat backrest from the vehicle seat seating position to the stowed position to move the seat base from the vehicle seat seating position, with the seat base extending forward to the stowed position with the seat base in an upright stadium position.

17. A seat arrangement according to claim 5, wherein:

the stowable seat vehicle floor connection comprises left and right side floor brackets fixed to a vehicle cabin floor;

the left and right side floor brackets each have a frontmost contour defining an upright stowed position front clearance profile;

the base to vehicle floor connection of the second outboard seat further comprises left and right side riser brackets connecting to the lateral guide rail arrangement and the left and right side riser brackets have a rearmost contour defining a rear clearance profile; and the front clearance profile is complementary to the rear clearance profile whereby the left and right side floor brackets do not block the left and right side riser brackets with a lateral movement of the one of the outboard seats along the lateral guide rail, with the vehicle seat in the stowed position.

18. A seat arrangement according to claim 5, wherein:

the first outboard seat, the second outboard seat and the stowable vehicle seat are each adjacent to a vehicle rear wall or rear bulkhead; and in the stowed position the stowable seat base and the seat backrest are fully rearward of the forward most front clearance profile of the seat vehicle floor connection and are forward of the vehicle rear wall or rear bulkhead.

* * * * *